United States Patent
Robb et al.

(10) Patent No.: US 8,681,458 B2
(45) Date of Patent: Mar. 25, 2014

(54) METHOD OF FORMING AN ESD DETECTOR AND STRUCTURE THEREFOR

(75) Inventors: Stephen Paul Robb, Fountain Hills, AZ (US); David M. Heminger, Scottsdale, AZ (US); Alejandro Lara-Ascorra, Gilbert, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1671 days.

(21) Appl. No.: 11/843,822

(22) Filed: Aug. 23, 2007

(65) Prior Publication Data

US 2009/0052100 A1 Feb. 26, 2009

(51) Int. Cl.
*H02H 9/00* (2006.01)
(52) U.S. Cl.
USPC ............................................ 361/56

(58) Field of Classification Search
USPC .......................................... 361/56, 91.1, 111
See application file for complete search history.

(56) References Cited

U.S. PATENT DOCUMENTS

| | | | |
|---|---|---|---|
| 5,315,255 A | 5/1994 | Bettinger | |
| 5,946,177 A * | 8/1999 | Miller et al. | 361/56 |
| 7,151,655 B2 | 12/2006 | Choo | |
| 7,545,614 B2 * | 6/2009 | Traynor et al. | 361/56 |
| 2002/0113293 A1* | 8/2002 | Robb et al. | 257/551 |
| 2003/0058592 A1* | 3/2003 | Hung et al. | 361/56 |
| 2003/0102923 A1* | 6/2003 | Vickram et al. | 330/298 |

* cited by examiner

*Primary Examiner* — Rexford Barnie
*Assistant Examiner* — Tien Mai
(74) *Attorney, Agent, or Firm* — Robert F. Hightower

(57) ABSTRACT

In one embodiment, and electro-static discharge detector is formed with a plurality of channels and is configured to detect a positive electro-static discharge and a negative electro-static discharge.

20 Claims, 3 Drawing Sheets

US 8,681,458 B2

METHOD OF FORMING AN ESD DETECTOR AND STRUCTURE THEREFOR

BACKGROUND OF THE INVENTION

The present invention relates, in general, to electronics, and more particularly, to methods of forming semiconductor devices and structures.

In the past, the electronics industry utilized various circuits to detect an electro-static discharge. Most prior circuits required an antenna to form a signal and then used electrical circuits to process the signal from the antenna. The size of the antenna made it difficult to place the prior ESD apparatus within an integrated circuit. The antenna also increased the cost of the ESD apparatus.

Other ESD apparatus that did not use an antenna could only detect a positive electro-static discharge. This limited the usefulness of the apparatus.

Accordingly, it is desirable to have a method of forming an ESD detector that reduces the cost of the ESD detector, that can be integrated onto an integrated circuit, and that can detect both positive and negative electro-static discharge events.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
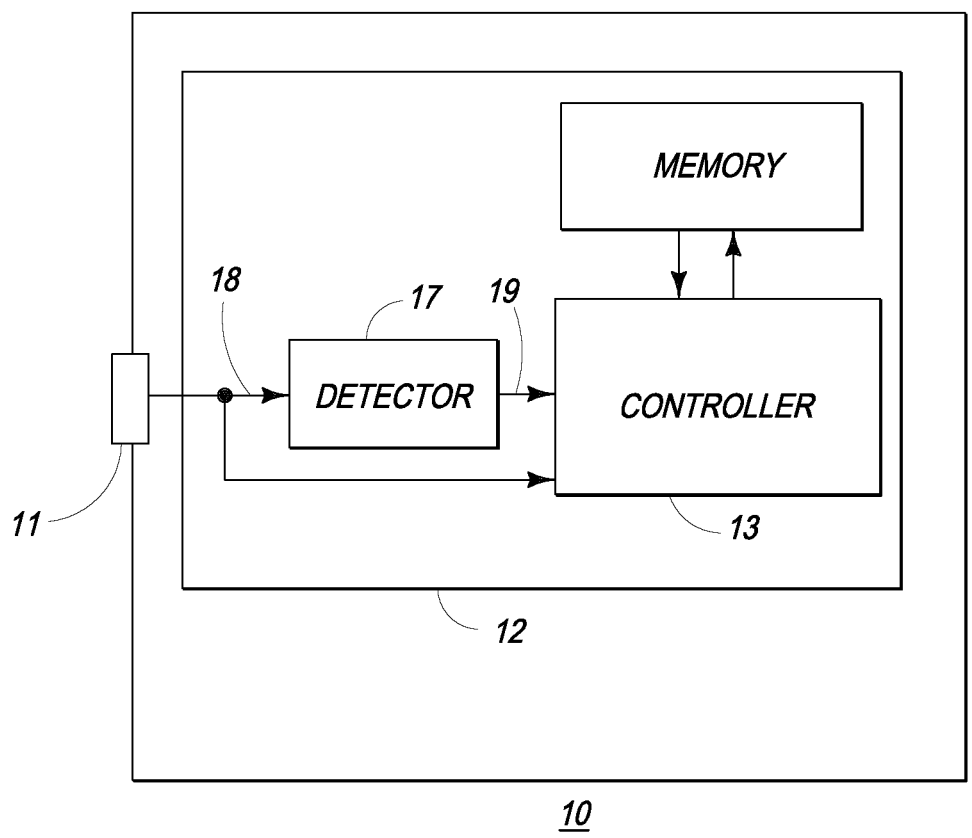
FIG. 1 schematically illustrates a generalized block diagram of an embodiment of a portion of an electronic apparatus that includes an ESD detector in accordance with the present invention.

FIG. 1 schematically illustrates a generalized block diagram of an electronics apparatus 10. Apparatus 10 generally includes a memory element that is used to store digital information. Apparatus 10 can be a variety of equipment types such as a digital music player, a digital video camera, a cell phone, or other type of apparatus. Many such apparatus have connectors, such as a connector 11, which is used to connect to other equipment. Such connectors can cause apparatus 10 to be susceptible to electro-static discharge (ESD). For example, apparatus 10 may be in the process of transferring data to or from the memory when an ESD occurs. The ESD may result in transferring incorrect data, or cause the data to be corrupted or lost, or cause other malfunctions of apparatus 10. Apparatus 10 generally includes an interconnect substrate 12 that is used to interconnect electronic components of apparatus 10 such as to connect a controller 13 to the memory or to electrically connect connector 11 to controller 13. Interconnect substrate 12 may be printed circuit (PC) board or a flex tape or other type of interconnect substrate that are well known to those skilled in the art. Apparatus 10 also includes an electro-static discharge (ESD) detector 17 that generally is interconnected to connector 11 and controller 13 on interconnect substrate 12. ESD detector 17 has a signal input 18 that generally is connected to connector 11 and an output 19 that provides an output signal to controller 13 or to another component of apparatus 10.

Figure 2:
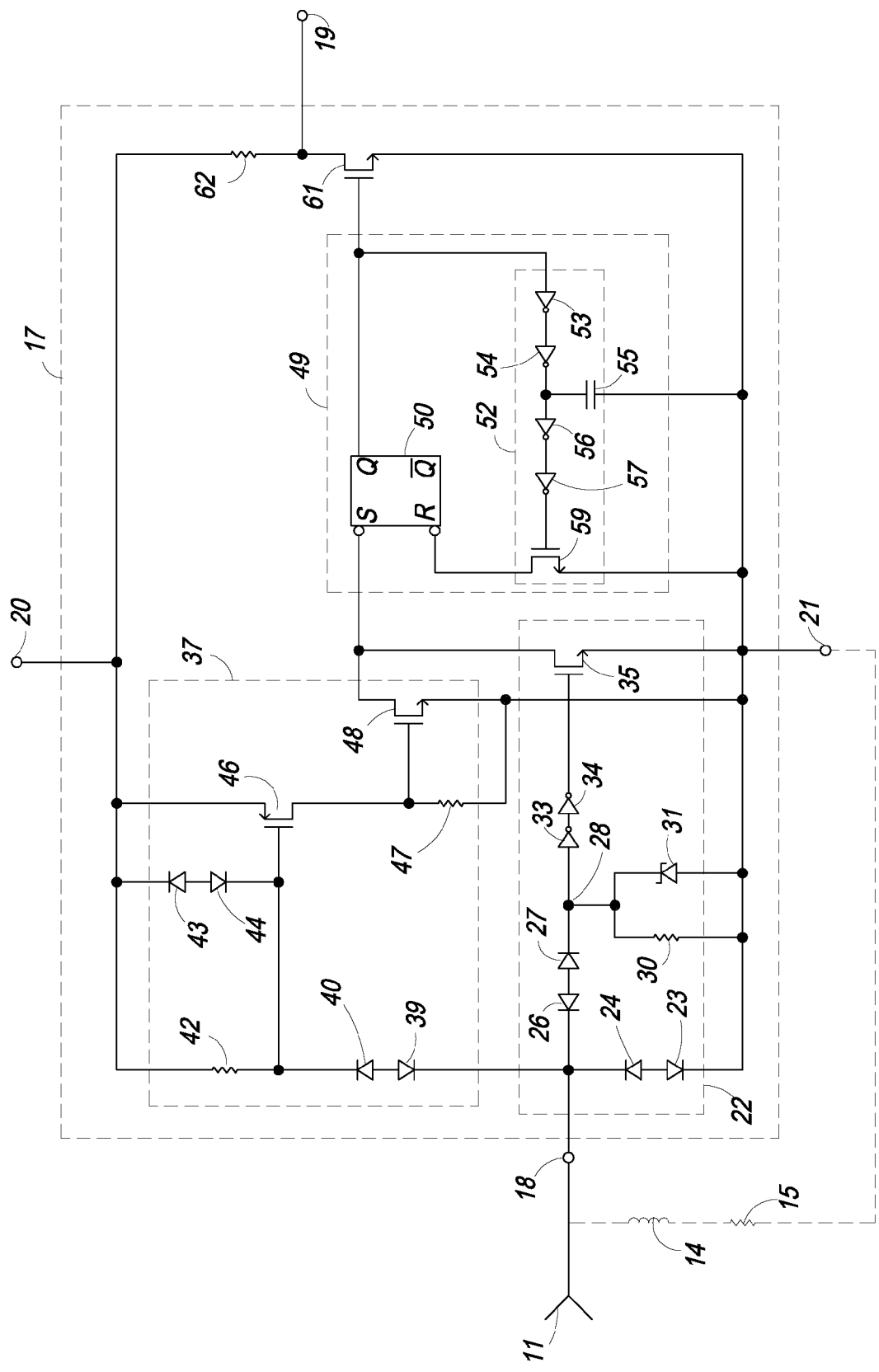
FIG. 2 schematically illustrates a portion of an exemplary embodiment of a portion of the ESD detector of FIG. 1 in accordance with the present invention.

FIG. 2 schematically illustrates a portion of an exemplary embodiment of ESD detector 17. In addition to signal input 18 and output 19, ESD detector 17 includes a power input or voltage input 20 and a power return or voltage return 21 that are connected to receive an operating voltage for operating some of the elements within detector 17. In a battery-powered apparatus, input 20 and return 21 may be connected to the respective positive and negative terminals of the battery in order to receive an operating voltage and operating power. As will be seen further hereinafter, detector 17 is configured to detect either a positive electro-static discharge or a negative electro-static discharge. Detector 17 also is configured to form an ESD detection signal on output 19 indicating the detection of either the negative electro-static discharge or the positive electro-static discharge. Detector 17 includes a positive ESD detection channel 22 that is utilized to detect the occurrence of the positive electro-static discharge and a negative ESD detection channel 37 that is utilized to detect the occurrence of the negative electro-static discharge. Detector 17 also includes a pulse generator 49 that is utilized to form the ESD detection signal or control signal indicating the detection of either the negative electro-static discharge or the positive electro-static discharge. An output transistor 61 and a resistor 62 assist in forming the ESD detection signal.

In the preferred embodiment, positive ESD detection channel 22 includes a pair of back-to-back diodes 23 and 24 that are connected between input 18 and return 21, a second pair of back-to-back diodes 26 and 27 that are connected between input 18 and a node 28, a zener diode 31 and a resistor 30 that are connected between node 28 and return 21, inverters 33 and 34 that have an input connected to node 28, and a transistor 35. Transistor 35 allows the output of channel 22 to be ORed together with the output of channel 37. In the preferred embodiment, negative ESD detection channel 37 includes a pair of back-to-back diodes 39 and 40, a resistor 42 connected between input 20 and diodes 39 and 40, another pair of back-to-back diodes 43 and 44, and transistors 46 and 48 along with a resistor 47. Diodes 23 and 24 also function as a voltage limiting circuit for channel 37. Each of diodes 23, 24, 26, 27, 39, 40, 43, and 44 may be formed as a plurality of series connected diodes. Connecting two or more diodes in series can be used to form a desired voltage drop. In the preferred embodiment, each of diodes 23, 24, 26, 27, 39, 40, 43, and 44 are two series connected polysilicon diodes. The preferred embodiment of pulse generator 49 includes a latch 50 and a delay circuit formed by inverters 53-57, a capacitor 55, and a transistor 59. When detector 17 is assembled onto an interconnect substrate, such as substrate 12 illustrated in FIG.

1, the interconnect substrate generally has parasitic inductance and resistance that are formed between input 18 and return 21 as illustrated by an inductor 14 and a resistor 15 that are shown in dashed lines (FIG. 1). This parasitic inductance and resistance can affect the shape and duration of the current and voltage that is formed at input 18 in response to a positive or negative electro-static discharge. When an electrode-static discharge occurs, there is generally a large voltage and current spike that occurs over a brief period of time. Generally, the peak current and peak voltage occurs over a period of a few nanoseconds, typically less than two nanoseconds (2 nsec.) and could last for only about one nanosecond (1 nsec.). The current generally decreases to a plateau for another time interval usually around twenty (20) nanoseconds and slowly decreases over another twenty to forty (20-40) nanoseconds. The peak value of the current could be as high as twenty to thirty amperes (20 to 30 amps) and the peak voltage could be between two thousand and eight thousand volts (2000-8000 V). The size and response time of the elements of channels 22 and 37 preferably are configured to detect the voltage during the time interval of the peak voltage and conduct the peak current. Detector 17 is configured to detect ESD events and provide the ESD detection signal on output 19 within one nanosecond (1 nsec.) of receiving the initial ESD voltage as specified in the International Electrotechnical Commission (IEC) specification commonly referred to as IEC 61000-4-2 (level 2) specification. The International Electrotechnical Commission has an address at 3, rue de Varembé, 1211 Genève 20, Switzerland.

Upon receiving a positive ESD, the large ESD voltage attempts to force input 18 to a positive voltage relative to return 21 and to a voltage value that is large relative to the voltage between input 20 and return 21. The large positive ESD voltage generally is one thousand volts (1000 V) or greater. However, diodes 23 and 24 function as a voltage limiting circuit that limits the positive voltage formed on input 18 to a value that is near a positive threshold voltage or threshold of the voltage limiting circuit. The positive threshold of the voltage limiting circuit is the reverse voltage of diode 24 plus the forward voltage of diode 23. As the voltage on input 18 (relative to return 21) reaches the positive threshold of the voltage limiting circuit, diode 23 begins to conduct in the forward direction and diode 24 conducts in the reverse direction. Consequently, diodes 23 and 24 generally are formed to conduct currents of at least seven to twenty amperes (7-20 amps) and preferably at least thirty amperes (30 amps). Diodes 23 and 24 are formed with a very large width, preferably at least one thousand five hundred to two thousand (1500-2000) microns wide, so that diodes 23 and 24 can conduct the large ESD currents. Because of the large width, diodes 23 and 24 do not have a sharp knee, thus, the voltage on input 18 may increase slightly above the positive threshold. Consequently, the voltage limiting circuit limits the voltage on input 18 to a voltage value that is less than the peak positive ESD voltage value and is near to the positive threshold. The voltage on input 18 generally increases no more that about thirty to fifty percent (30%-50%) greater than the positive threshold. For example, the positive threshold of the voltage limiting circuit may be around fourteen volts (14 V) which may limit the voltage on input 18 to a voltage of about twenty volts (20 V).

Diodes 26 and 27 along with diode 31 and resistor 30 form a positive translator circuit that translates the voltage on input 18 to a lower voltage on node 28. The threshold of the positive translator circuit is the reverse voltage of diode 26 plus the forward voltage of diode 27. This is approximately the value of the voltage on input 18 that current begins to flow through diodes 26 and 27. A first portion of the ESD current from input 18 is conducted through diodes 23 and 24. This first portion of the ESD current generally is a majority of the current resulting from the ESD event. After the voltage on input 18 reaches the threshold of the positive translator circuit, a second portion of the ESD current from input 18 begins to flow through diodes 26 and 27 to node 28 and then through resistor 30 and possibly through diode 31. This second portion of the ESD current is generally smaller, therefore, the width of diodes 23 and 24 generally is usually about twenty to fifty (20-50) and preferably about forty (40) times greater than the width of diodes 26 and 27.

The current through resistor 30 forms a voltage on node 28. As the value of the voltage on input 18 increases, the current through resistor 30 increases and forms a voltage that is large enough to trigger inverter 33 and force the output of inverter 33 low. Thus, the voltage on input 18 reaches the threshold of channel 22 (the threshold of the positive translator circuit plus the input threshold of inverter 33). Diode 31 preferably is a zener diode so that the voltage on node 28 can be limited to a voltage that is less than the maximum voltage that can be sustained by the input of inverter 33. For example, diodes 26 and 27 may be formed to have a threshold of about fourteen volts (14 V) and diode 31 may have a zener voltage of about five volts (5 V) which would limit the maximum voltage on node 28 to about five to six volts (5-6 V).

Inverters 33 and 34 in addition to transistor 35 form a shaping circuit that shapes the analog ESD voltage and current into a digital signal. The low from inverter 33 forces the output of inverter 34 high. The high from inverter 34 enables transistor 35 which pulls the set input of latch 50 low thereby setting latch 50. Setting latch 50 forces the Q output high to enable transistor 61 and force output 19 low to form the ESD detection signal on output 19. The high Q output is also used to form a delay that establishes a pulse width of the ESD detection signal. The high Q output forces the output of inverter 53 low and the output of inverter 54 high. Capacitor 55 slows the rise time of the output of inverter 54 so that inverter 56 is delayed from receiving the high from inverter 54. As capacitor 55 charges past the threshold of inverter 56, the output of inverter 56 goes low thereby forcing the output of inverter 57 high to enable transistor 59 and reset latch 50. Resetting latch 50 forces the Q output low to disable transistor 61 and allow resistor 62 to pull output 19 back high. Thus, generator 49 receives the positive detect signal from channel 22 and forms the ESD detection signal on output 19 as a pulse having a width that is controlled by the string of inverters 53-57 and capacitor 55.

A negative ESD attempts to force input 18 to a negative voltage having a value that is much less than the voltage on return 21. The negative ESD voltage is generally negative one thousand volts (−1000 V) or more. However, the voltage limiting circuit of diodes 23 and 24 limits the negative voltage on input 18 to a negative value that is near the negative threshold of the voltage limiting circuit (the reverse voltage of diode 23 plus the forward voltage of diode 24). As the voltage on input 18 reaches the negative threshold of the voltage limiting circuit, diode 24 begins to conduct in the forward direction and diode 23 conducts in the reverse direction. Because of the soft knee, the voltage on input 18 may become slightly more negative than the negative threshold similarly to the condition explained for the positive ESD. Consequently, the voltage limiting circuit limits the voltage on input 18 to a negative voltage value (relative to return 21) that is less negative than the peak negative ESD voltage value and that is near the negative threshold of the voltage limiting circuit. For example, diodes 23 and 24 may have a negative threshold of around fifteen volts (15 V) which may limit the voltage on input 18 to a value of approximately minus twenty volts (−20 V).

Diodes 39 and 40 and resistor 42 function as a negative voltage translator circuit that translates the negative voltage on input 18 to a less negative voltage on the gate of transistor 46. The threshold of the negative voltage translator circuit is the forward voltage of diode 39 plus the reverse voltage of diode 40. As the voltage difference between the voltage on input 20 minus the voltage on input 18 becomes just slightly greater than the threshold of the negative voltage translator circuit, diode 39 begins to conduct in the forward direction relative to diode 39 and diode 40 begins to conduct in the reverse direction relative to diode 40. The difference between the voltage on input 20 minus the voltage on input 18 is referred to hereinafter as the delta voltage (Vd) as shown below:

$$Vd = V20 - V18$$

where
Vd—is the delta voltage,
V20—is the voltage on input 20 relative to return 21, and
V18—is the voltage on input 18 relative to return 21.

As diodes 39 and 40 begin to conduct, current begins to flow from input 20 through resistor 42 and diodes 39 and 40. As the voltage on input 18 becomes more negative, the current through resistor 42 increases until the voltage across resistor 42 is greater than the threshold voltage of transistor 46, and transistor 46 begins to conduct. This value of the delta voltage (Vd) that causes transistor 46 to conduct is the threshold voltage of negative ESD detection channel 37. For example, if the voltage on input 20 is three volts (3V) and if diodes 23 and 24 limit the voltage on input 18 to minus twenty volts (−20V), the delta voltage (Vd) is twenty three volts (23V). If diodes 39 and 40 have a threshold voltage of around fifteen volts (15V), then the gate-to-source (Vgs) that is applied to transistor 46 is about eight volts (8V). If the threshold voltage of transistor 46 is five volts (5V), then the threshold of channel 37 is twenty volts (20V) and transistor 46 becomes enabled when input 18 has a voltage of about minus seventeen volts (−17V). Thus, the negative translator circuit translates the large negative ESD voltage on input 18 to a lower voltage on the gate of transistor 46.

Transistors 46 and 48 in addition to resistor 47 form a shaping circuit that shapes the analog ESD voltage and current into a digital signal. Enabling transistor 46 pulls the gate of transistor 48 high thereby enabling transistor 48 which pulls the output of channel 37 low. The low on the output of channel 37 functions as the negative detect signal. The low negative detect signal sets latch 50 to form the ESD detection signal as a pulse on output 19 as described previously for the setting of latch 50 from the positive detect signal.

The majority of the negative ESD current flows through diodes 23 and 24. A portion of the negative ESD current flows through resistor 42 and diodes 39 and 40. The value of resistor 42 is chosen to limit the Vgs that is applied to transistor 46 to a value that is less than the maximum Vgs that transistor 46 can withstand. In the preferred embodiment, resistor 42 is approximately one hundred fifty (150) ohms and typically limits the applied Vgs to about four to five volts. Diodes 43 and 44 are coupled across the gate and source of transistor 46 in order to protect transistor 46 by limiting the maximum Vgs that is applied to transistor 46. Diodes 39, 40, 43, and 44 usually are formed similar to diodes 26 and 27 since each of diodes 39, 40, 43, and 44 conduct less current than diodes 23 and 24. The forward voltage of diode 43 plus the reverse voltage of diode 44 generally is less than the maximum Vgs that can be sustained by transistor 46. For example, the combined voltages of diodes 43 and 44 may be about seven volts (7 V).

As can be seen from FIG. 1, detector 17 supplies the ESD detection signal to controller 13. Controller 13 may then perform a variety of algorithms to prevent the ESD from affecting the data of apparatus 10. Controller 13 may cause a re-read of a disk drive in order to retrieve valid data, or may initiate an error checking algorithm in order to detect data that may be changed by the ESD.

During normal operation of detector 17 (FIG. 2) without an electro-static discharge (ESD) event, diodes 23 and 24, 26 and 27, and 39 and 40 have a very high impedance so that detector 17 does not disturb the normal data signals received on connector 11. These data signals generally have a maximum voltage that is less than the threshold voltage of diodes 23 and 24, diodes 26 and 27, and diodes 39 and 40.

In order to facilitate this functionality for detector 17, a cathode of diode 24 is connected to input 18 and an anode is connected to an anode of diode 23 which has a cathode connected to return 21. A cathode of diode 26 is connected to input 18 and an anode is connected to an anode of diode 27 which has a cathode connected to node 28. The input of inverter 33 is connected to node 28 and the output is connected to the input of inverter 34 which has an output connected to a gate of transistor 35. The first terminal of resistor 30 is connected to node 28 and to a cathode of diode 31. A second terminal of resistor 30 is connected to return 21 and an anode of diode 31 is connected to return 21. A source of transistor 35 is connected to return 21 and a drain is connected to the set input of latch 50. A cathode of diode 39 is connected input 18 and an anode is connected to an anode of diode 40 which has a cathode connected to a gate of transistor 46. A first terminal of resistor 42 is connected to a gate of transistor 46 and a second terminal is connected to input 20. A cathode of diode 44 is connected to an anode of diode 43 which has a cathode connected to input 20. A source of transistor 46 is connected to input 20 and a drain is commonly connected to a gate of transistor 48 and a first terminal of resistor 47. A second terminal of resistor 47 is connected to return 21 and to a source of transistor 48. A drain of transistor 48 is connected to the set input of latch 50. The Q output from latch 50 is commonly connected to a gate of transistor 61 and to the input of inverter 53. An output of inverter 53 is connected to an input of inverter 54 which has an output commonly connected to an input of inverter 56 and a first terminal of capacitor 55. A second terminal of capacitor 55 is connected to return 21. An output of inverter 56 is connected to an input of inverter 57 which has an output connected to a gate of transistor 59. A source of transistor 59 is connected to return 21 and a drain is connected to the reset input of latch 50. A source of transistor 61 is connected to return 21 and a drain is connected to output 19 into a first terminal of resistor 62. A second terminal of resistor 62 is connected to input 20.

Figure 3:
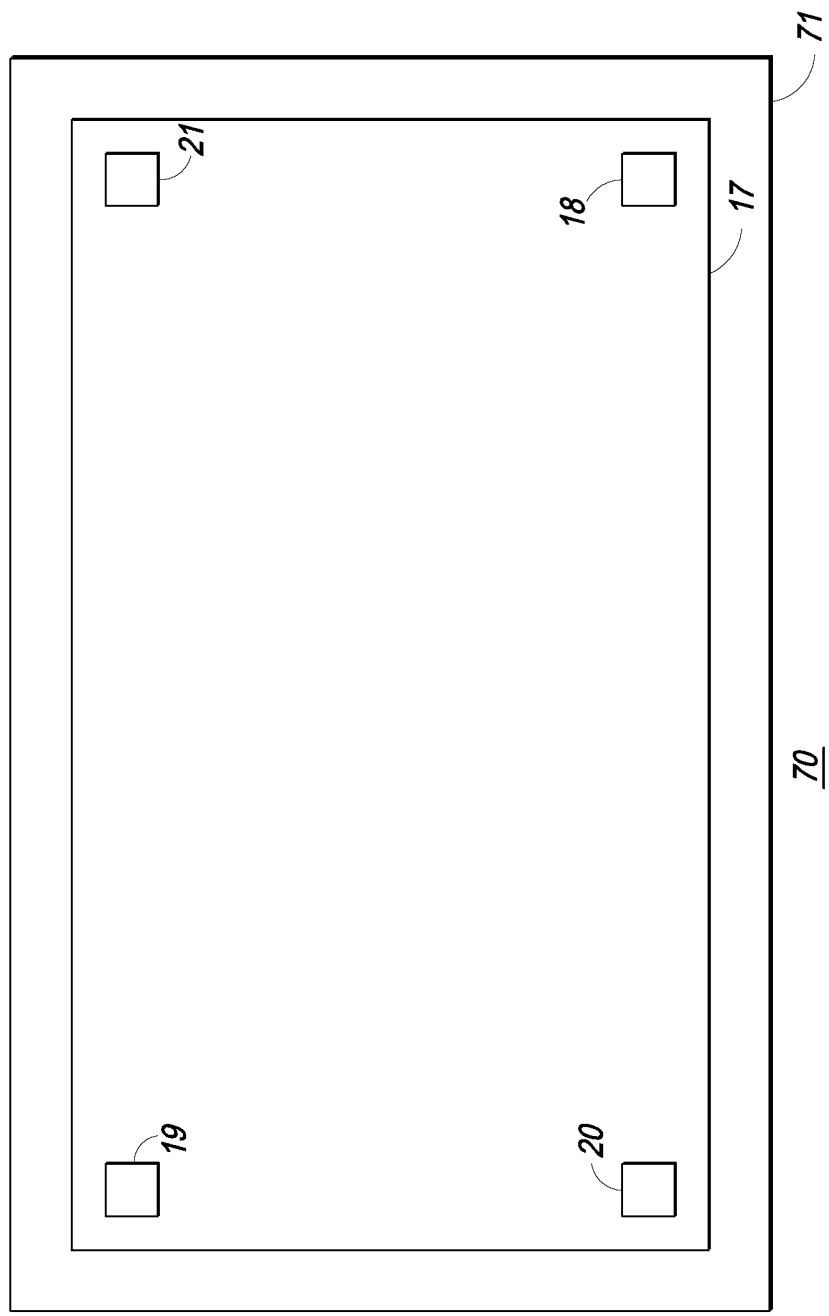
FIG. 3 schematically illustrates an enlarged plan view of a semiconductor device that includes the ESD detector of FIG. 2 in accordance with the present invention.

FIG. 3 schematically illustrates an enlarged plan view of a portion of an embodiment of a semiconductor device or integrated circuit 70 that is formed on a semiconductor die 71. Detector 17 is formed on die 71. Die 71 may also include other circuits that are not shown in FIG. 3 for simplicity of the drawing. Detector 17 and device or integrated circuit 70 are formed on die 71 by semiconductor manufacturing techniques that are well known to those skilled in the art. In one embodiment, detector 17 is formed on a semiconductor substrate as an integrated circuit having four external leads 18-21.

In view of all of the above, it is evident that a novel device and method is disclosed. Included, among other features, is forming an ESD detector to have a first channel to detect a first ESD event and a second channel to detect a second ESD event. Configuring the ESD detector to limit the maximum value of the voltage that is applied to some of the detector circuits to a value that is less than the maximum ESD voltage facilities detecting the ESD. Translating the voltage to a second lower value facilitates forming a signal indicating that the ESD is detected. Using two separate channels facilitates detecting a positive and also a negative ESD.

While the subject matter of the invention is described with specific preferred embodiments, it is evident that many alternatives and variations will be apparent to those skilled in the semiconductor arts. For example, the limiting circuits may be formed from other voltage limiting circuits as long as the circuit limits the maximum input voltage to be less than the peak ESD voltage. The voltage translators may be formed from other translator circuits as long as the other circuits translates the maximum voltage to a voltage that is less than the maximum allowable input voltage of the circuits used to form the detection signals. Additionally, other circuits may be used instead of the circuits used for pulse generator 49. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. An electrostatic discharge detector comprising:
an input for receiving an electrostatic discharge;
a limiting circuit coupled to receive the electro-static discharge, the limiting circuit configured to limit the input to a first voltage responsively to a positive value of the electro-static discharge and configured to limit the input to a second voltage responsively to a negative value of the electro-static discharge;
a first voltage translator coupled to receive the first voltage and responsively form a third voltage having a value that is less than the first voltage;
a first shaping circuit having an input coupled to receive the third voltage and assert a positive detect signal;
a second voltage translator coupled to receive the second voltage and form a fourth voltage having a value that is less negative than the second voltage; and
a second shaping circuit having an input coupled to receive the fourth voltage and assert a negative detect signal.

2. The electro-static discharge detector of claim 1 further including a pulse generator configured to receive the positive detect signal and the negative detect signal and assert an ESD detection signal responsively to the positive detect signal and assert the ESD detection signal responsively to the negative detect signal.

3. The electro-static discharge detector of claim 1 wherein the limiting circuit includes a first pair of back-to-back diodes coupled between the input and a voltage return of the electro-static discharge detector.

4. The electro-static discharge detector of claim 3 wherein the first voltage translator includes a second pair of back-to-back diodes coupled between the input and the input of the first shaping circuit.

5. The electro-static discharge detector of claim 4 wherein the first shaping circuit includes a first inverter and a second inverter coupled in series to receive the third voltage and a first transistor coupled to an output of the second inverter.

6. The electro-static discharge detector of claim 3 wherein the second voltage translator includes a second pair of back-to-back diodes coupled between the input and the input of the second shaping circuit.

7. The electro-static discharge detector of claim 6 wherein the second voltage translator includes a resistor coupled between the input of the second shaping circuit and a voltage input of the electro-static discharge detector.

8. The electro-static discharge detector of claim 7 wherein the second shaping circuit includes a first transistor coupled to receive the fourth voltage from the second voltage translator and a second transistor coupled to receive a signal from the first transistor and form the negative detect signal.

9. A method of forming an ESD detector comprising:
configuring a first channel to detect a positive electro-static discharge and responsively form a positive detect signal;
configuring a second channel to detect a negative electro-static discharge and responsively form a negative detect signal; and
configuring the ESD detector to form an ESD detection signal responsively to the positive detect signal and form the ESD detection signal responsively to the negative detect signal.

10. The method of claim 9 wherein configuring the first channel to detect the positive electro-static discharge and responsively form the positive detect signal includes configuring the first channel to receive the positive electro-static discharge having a first voltage value and form a second voltage having a second value, and form the positive detect signal responsively to forming the second voltage.

11. The method of claim 10 further including configuring the first channel to limit a voltage value on an input of the ESD detector to the second voltage responsively to receiving the positive electro-static discharge, to translate the second voltage to a third voltage having a third value that is lower than the second value, to detect the third voltage, and responsively form the positive detect signal.

12. The method of claim 11 wherein configuring the first channel to limit a voltage value on the input of the ESD detector to the second voltage includes coupling a first pair of back-to-back diodes between the input and a voltage return of the ESD detector wherein the first pair of back-to-back diodes each have a width that is sufficient to conduct approximately thirty amps and have a summed voltage of approximately the second value.

13. The method of claim 12 wherein configuring the first channel to limit the input of the ESD detector to the second voltage includes operably coupling a second pair of back-to-back diodes to receive the second voltage and to conduct a current responsively to the ESD detector forming the second voltage and configuring the ESD detector to form the third voltage responsively to conducting the current.

14. The method of claim 13 further including coupling a first resistor and another diode to receive at least a portion of the current.

15. The method of claim 10 wherein configuring the second channel to detect the negative electro-static discharge and responsively form the negative detect signal includes configuring the second channel to receive the negative electro-static discharge having a first negative voltage value, to reduce the first negative voltage value to a second negative voltage having a second negative value, and form the negative detect signal responsively to the ESD detector forming the second negative voltage.

16. The method of claim 9 further including configuring the ESD detector to form a detect signal representing detection of either of the positive electro-static discharge or the negative electro-static discharge within no greater than about five nano-seconds of receiving either of the positive electro-static discharge or the negative electro-static discharge.

17. A method of forming an ESD detector comprising:
configuring the ESD detector with a plurality of ESD detection channels to detect a negative electro-static discharge and a positive electro-static discharge and form a control signal responsively to detection of the negative electro-static discharge and form the control signal responsively to the positive electro-static discharge.

18. The method of claim 17 further including configuring the ESD detector to receive the negative electro-static discharge on an input of the ESD detector wherein the negative electro-static discharge has a first negative value relative to the input, and configuring the ESD detector to responsively limit a voltage at the input to a second negative voltage that is less negative than the first negative value.

19. The method of claim 18 further including configuring the ESD detector to receive the positive electro-static discharge on the input of the ESD detector wherein the positive electro-static discharge has a first positive value relative and to the input, and configuring the ESD detector to responsively limit the voltage at the input to a second positive voltage that is less than the first positive value.

20. The method of claim 17 further including configuring the ESD detector with a first ESD detection channel that is configured to form a first ESD detection signal and a second ESD detection channel that is configured to form a second ESD detection signal.

\* \* \* \* \*